J. T. BROWN.
STOP-COCK CONNECTIONS TO WATER-PIPES.

No. 173,891. Patented Feb. 22, 1876.

Witnesses:
Chas. F. Meisner.
J. W. Herthel.

Inventor:
Joseph T. Brown
per. Hershel & Co.
Attys.

UNITED STATES PATENT OFFICE.

JOSEPH T. BROWN, OF ST. LOUIS, MISSOURI.

IMPROVEMENT IN STOP-COCK CONNECTIONS TO WATER-PIPES.

Specification forming part of Letters Patent No. 173,891, dated February 22, 1876; application filed January 6, 1876.

*To all whom it may concern:*

Be it known that I, JOSEPH T. BROWN, of St. Louis, Missouri, have invented an Improved Stop-Cock Connection to Main Water-Pipes, of which the following is a specification:

It is well known that branch-pipe connections to a main water-pipe are necessary for furnishing water-supply for household purposes, also for street-pavements, gardens, and otherwise for furnishing water-supply to meet special or general emergencies; that said branch-pipes require separate stop-cocks, their adjuncts of boxes, incurring extra labor, time, and expense; further, as is well known from the manner in which the water-pipes are connected and laid out in large cities, it frequently occurs that a neighborhood of users suffers from a lack of water-supply, owing to the cause of "shutting off" a single stop-cock; that when it is required to shut off the cock controlling the supply to a street, or garden, &c., it at the same time shuts off the supply to a household, &c. Hence a great want exists of arranging or connecting stop-cocks, their pipes, &c., so as to be able to control the same according to the requirements of private and public necessities. This is the main object of my invention; and in doing so also avoid the necessities of extra stop-cocks, their separate boxes, fixtures, &c., and the extra expense, time, and labor attending their use.

My invention can, therefore, be stated to consist in the improved features and novel manner of branch-pipe connections to a main water-pipe, and as will now more fully appear.

Figure 1:
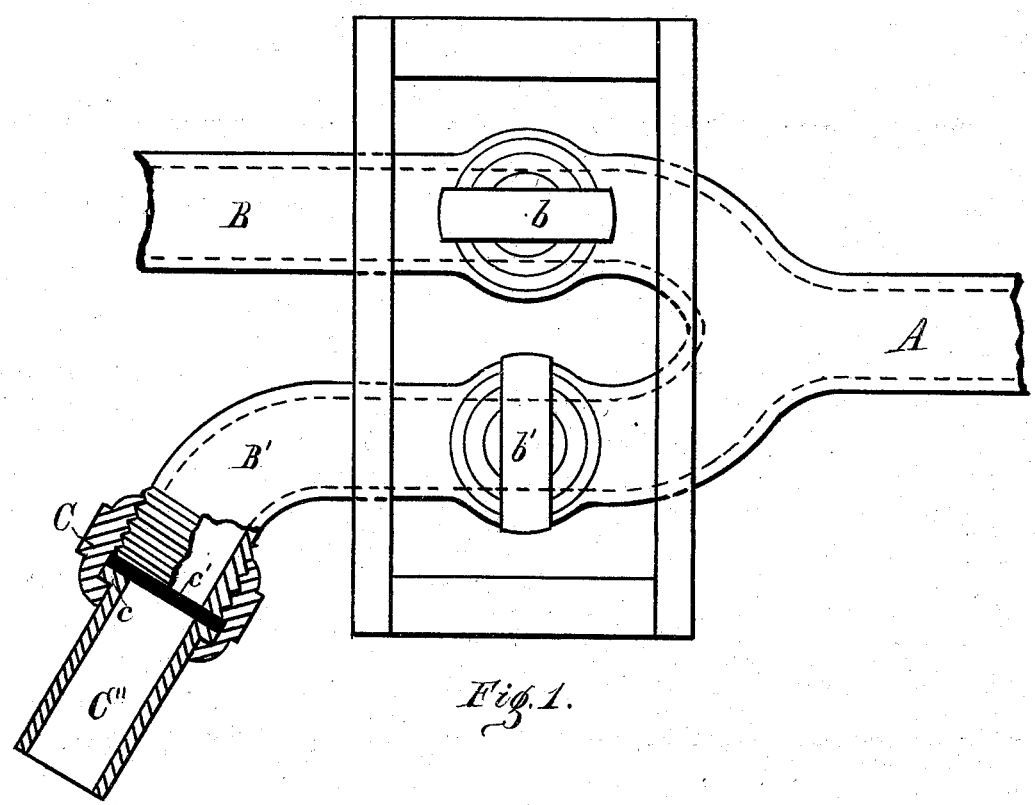
Figure 2:
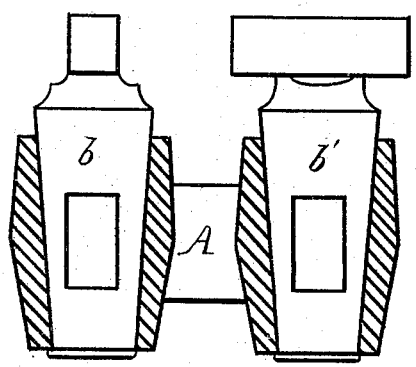

Of the drawing, Figure 1 is a top plan of my invention, also showing in section a detail improvement, hereinafter to be described. Fig. 2 is a cross-section through the two branch-pipes on line $x\ x$ of Fig. 1, showing the position of the cocks.

A represents the main supply-pipe. This, from the street, I provide with branch-connections in a manner as follows: To the main pipe I connect, or make to form part thereof, the branch-pipes B B', that of B being, say, to furnish the household supply, that of B' for sprinkling streets, pavements, garden, &c. Each of the branches B B' I provide with an ordinary stop-cock, $b\ b'$, so that a turnkey can open and close said cocks.

Both branch-pipes I arrange so as to be close in proximity to each other, and at the place required, and so that a single boxing will suffice for both cocks. In Fig. 1, the boxing is shown inclosing both the cocks. From the cocks the branches B B' are made to extend to any place where it is desired to furnish water-supply.

The cocks $b\ b'$ I arrange so as to have their T-handles positioned at right angles to each other, as shown in the figures. This feature is to enable the turnkey to at all times correctly open or shut the required cock. Thus the cocks $b\ b'$, (see figures,) positioned as shown, are open to allow the water-supply to pass through the branches. Now, since the key in the hands of the operator must be changed to open or close either of the cocks, it is plain that it is this adaptation of the key to the cocks that enables the operator to know the position of each, and to control said cocks, or either of them, without mistake. The inconveniences arising from shutting off the wrong stop-cock are thus guarded against.

A further feature of improvement consists in the manner in which the branch B' can be adapted for use or non-use. I provide this branch with screw-threads fitted to receive a coupling, C. This coupling receives a short pipe, C'', one end of which has an annular bearing, $c$. (See Fig. 1.) The pipe C'' is passed through the coupling, as that the bearing $c$ of the pipe shall abut against the inner shoulder of said coupling, as shown in Fig. 1. In case this pipe C'' is not to be used, its inner end is plugged by a suitable washer of metal or rubber. (See $c'$, Fig. 1.) The coupling, with pipe and plug, is next properly united to the threads of the branch, and thus the water-supply is shut off during the time of the non-use of said branch. In case, however, further pipe-connection is to be made to the branch B', the coupling is unscrewed, the plug or washer is removed, the coupling is again screwed in place, and the joint of the pipe to that of C' is soldered in manner usual. A most ready and convenient means to furnish water-supply to the branch B' is thus obtained, avoiding the difficulties encountered when, as in the customary way, a new branch-pipe connection and its adjuncts are required to be made with the main water-pipe. My invention thus enables me to use but one stop-cock boxing, to have the branches controlled from the same place, to regulate and control the water-supply of one branch without interfering with that of the other, and otherwise to gain advantages of economy readily apparent.

What I claim is—

The pipes B B', arranged with relation to a main water-pipe, A, and having their cocks $b\ b'$ at right angles to each other when in open condition, and inclosed in a single box, as and for the purposes set forth.

In testimony of said invention I have hereunto set my hand.

JOSEPH T. BROWN.

Witnesses:
WILLIAM W. HERTHEL,
CHARLES F. MEISNER.